United States Patent

[11] 3,559,781

| [72] | Inventor | Thomas T. Brunelle |
| | | Glassboro, N.J. |
| [21] | Appl. No. | 781,762 |
| [22] | Filed | Dec. 6, 1968 |
| [45] | Patented | Feb. 2, 1971 |
| [73] | Assignee | Precision Specialties, Inc. |
| | | Pitman, N.J. |
| | | a corporation of Missouri |

[54] SPRING CLUTCH-BRAKE WITH ADJUSTABLE STOP COLLAR
6 Claims, 6 Drawing Figs.

[52] U.S. Cl. .................................................... 192/12, 192/26, 192/110
[51] Int. Cl. ................................................... F16d 67/02
[50] Field of Search .......................................... 192/12B-1, 22, 26, 33C, 81, 110

[56] References Cited
UNITED STATES PATENTS
2,134,202  10/1938  Racklyeft .................... 192/26

| 3,220,523 | 11/1965 | Hepner......................... | 192/81 |
| 3,228,497 | 1/1966 | Schneider..................... | 192/12B-1 |
| 3,434,576 | 3/1969 | Blodgett....................... | 192/12B-1 |

Primary Examiner—Benjamin W. Wyche
Attorney—Howson and Howson

ABSTRACT: A stop collar for a clutch brake employs different numbers of slots at opposite edges to receive the end tangs of clutch and brake springs, respectively. Each of the springs is fixed to an output hub at its opposite end. The clutch spring tends to wrap down on an input hub, which it surrounds, in which position the brake spring is out of contact with a frame hub, which it surrounds. Relative rotation between the collar and the output hub will release the clutch spring and engage the brake spring. Slot arrangements with different numbers of slots on opposite ends allow accommodation of springs no matter what the angular spacing between their end tangs.

PATENTED FEB 2 1971  3,559,781

INVENTOR:
THOMAS T. BRUNELLE
BY Howson & Howson
ATTYS

SPRING CLUTCH-BRAKE WITH ADJUSTABLE STOP COLLAR

The present invention relates to a clutch brake of the type disclosed in application of John H. Weatherby, Ser. No. 738,937, filed Jun. 21, 1968 for a "Clutch Brake Having Positive Output Position Selection." More specifically, the present invention is directed to a one-piece stop collar for use with a clutch of this general type which provides multiple prefabricated points of attachment for each of the clutch and brake springs in such an arrangement that relatively few points of attachment for each of the springs provide a large number of choices of angular spacing between the selected points of attachment of the brake and clutch springs.

As explained in the above-identified Weatherby specification the clutch brake of this type has the major advantage of being capable of having its output stopped at a precise, predetermined position. However, the structure involved is complicated by the use of two helical springs which must be fixed to the output hub as well as to the stop collar. In order to give access to the output hub to permit adjustment of the point of attachment of the brake spring, the stop collar in the Weatherby structure has been made in two pieces This is because one end of the helical springs has to be circumferentially adjustable. For this purpose Weatherby provides a separate adjustment ring on the output hub to make such adjustment possible and the two piece collar is separated to give access to this ring.

If springs were all exactly the same length, the ends of the brake and clutch springs attached to the output hub could be fixed in predetermined positions to that hub and the other ends could be fixed in predetermined position to a one-piece collar. As a practical matter, however, due to tolerance considerations, springs come in different lengths and some adjustment has to be made. As explained above, in the structure as originally conceived by Weatherby this was accomplished by effectively adjusting the position of attachment of the brake spring to the output hub until the amount of movement necessary to disengage the clutch and engage the brake properly was provided. The amount of movement selected is preferably such that the clutch and brake are operable with a minimum amount of relative movement between the collar and output hub. When properly adjusted relative rotational movement of the stop collar and output hub in one direction will disengage the clutch and engage the brake and the same amount of movement in the opposite direction will disengage the brake and engage the clutch.

The present invention is directed to a simplified solution of the problem of compensation for differing spring lengths. In accordance with the present invention a separate adjustable piece of attachment of at least one of the two springs to the output hub can be eliminated and both of these springs can be attached directly and adjustably to the output hub. Instead of making adjustment at the output hub, adjustment is then made at the control collar. This adjustment is accomplished providing a multiple number of prefabricated points of attachment around a given circumference of the collar for the clutch spring and a different number of prefabricated points of attachment around another circumference of the collar for attachment of the brake spring.

Preferably, the circumferences selected are the edges at the opposite ends of the collar and the prefabricated points of attachment are simply slots in the edge which receive radially outwardly extending end tangs of the springs. In assembly the collar is placed in a position between respective tangs at the ends of the clutch and brake springs and the resilience of the springs in the axial direction tends to draw the tangs into the collar. The optimum position of the tangs is determined and the collar rotated until slots occur at the approximate angular spacing required to accept the tangs.

More specifically, the present invention relates to a clutch-brake which comprises a frame together with input and output means rotatable relative to the frame and including, respectively, input and output hubs. A brake hub is also provided which is fixed to the frame and relative to which the other hubs rotate. The hubs are coaxial and arranged so that the output hub lies axially intermediate the input and brake hubs. A helical clutch spring is wound about at least the input hub and fixed at one end to the output hub, and a helical brake spring is wound about at least the brake hub and fixed at one end to the output hub. A common stop collar of tubular form engages the opposite ends of the brake and clutch springs from those attached to the output hub. When the clutch is engaged relative rotational movement between the stop collar and output hub in one direction will cause the clutch spring to disengage from the input hub and the brake spring to engage the frame hub. Relative movement in the other direction will reverse the action. The one-piece stop collar provides a predetermined number of prefabricated points of attachment for the clutch spring distributed around a selected circumference of the collar and a different number of prefabricated points of attachment for the brake spring distributed around another selected circumference of the collar. As a consequence, rotational change of the collar position permits selection of a discrete number of combinations of prefabricated points of attachment for approximating angular spacings between the ends of the springs to be attached to the collar in order to accomplish the clutching and braking as described.

For a better understanding of the present invention reference is made to the accompanying drawings in which.

Figure 2:
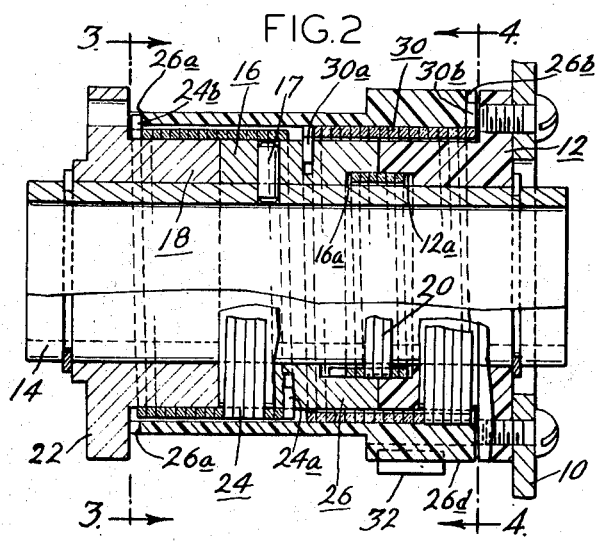
FIG. 2 is a sectional view along line 2–2 of FIG. 1.
Figure 3:
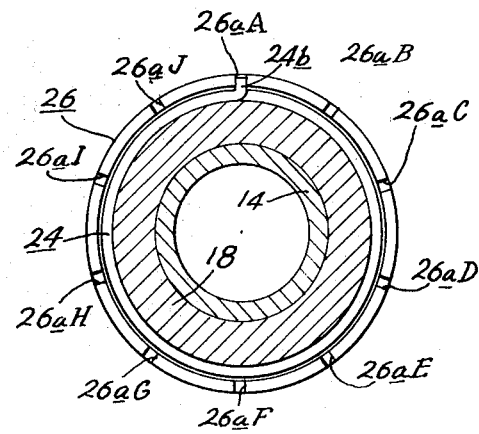
FIG. 3 is a sectional view along line 3–3 of FIG. 2.

Referring to FIG. 2, it will be observed that reference frame is provided, in this case by frame plate 10, which may be fixed relative to surrounding structure of machinery or other apparatus in which the clutch-brake is employed. Fixed to the frame plate 10 is frame hub structure 12, the function of which will be explained hereafter in further detail. The frame hub, among other things, provides an inner bearing surface which provides a good rotational fit with the tubular shaft 14 which is rotatable relative to the frame. Shaft 14, in turn, has fixed to it an output hub 16. Output hub 16 in this instance is fixed to the shaft 14 by pin 17 but it may be fixed to the shaft by any appropriate means, Also rotatably supported along shaft 14 is input hub 18.

Frame hub 12 and output hub 16 are counterbored to provide internal cylindrical surfaces 12a and 16a. Urged outwardly by its spring resilience into the surface 12a and 16a is helical antibackup spring 20 which is selected of such hand as to permit movement of the output hub relative to the frame hub only in the direction of normal drive, and not in the reverse direction. Rotation in the direction of normal drive is such as to tend to cause the collapse of spring 20, whereas, rotation in the opposite direction tends to cause outward expansion of spring 20 and the resulting binding prevents relative movement of output hub 16 with respect to frame hub 12.

The nature of the reference frame and its relationship to the tubular rotatable shaft is described in greater detail in U.S. Pat. No. 3,373,851 to John S. Baer.

Input hub 18 is a tubular member having a radially outwardly extending flange 22, which is bolted or otherwise suitably affixed to a pulley sheave, gear or other input means from which rotational movement is transmitted to the input hub. The outer face of the tubular portion of input hub 18 and the outer face of output hub 16 are preferably of the same, or closely similar, diameter and provide cylindrical clutch surfaces. As shown in FIG. 2, a helical clutch spring 24 couples the input hub to the output hub. The inherent resilience of the spring 24 urges the spring inwardly into contact with the outer cylindrical surfaces of the input and output hubs. Clutch spring 24 is attached to the output hub by radially inwardly directed tang 24a which snugly fits into a radially inwardly directed slot in output hub 16 provided for that purpose. Clutch spring 24 must be wrapped about input hub 18 and preferably is also wrapped about the output hub as well. The hand of spring 24 is here left but is determined so that the forward rotation of the input hub will tend to cause the spring to wrap down more tightly on the input and output hubs. At the other end of the clutch spring is radially outwardly directed tang 24b, which is engaged by one of a plurality of axially extending slots 26a in one edge of tubular stop collar member 26. Since the clutch spring tends to wrap down due to its inherent resilience, the clutch is normally engaged. The collar is pulled to a position in which the clutch is engaged with the cylindrical surfaces of input hub 18 and output hub 16. Disengagement of the clutch is achieved by relative movement of the stop collar 26 with respect to the output hub which tends to unwind or unwrap the clutch spring 24. This is done by stopping the collar 26 relative to the frame 10. The output hub being coupled to the input hub continues to run until the spring is released from the input hub.

Also, connected between the output hub 16 and the stop collar 26 is helical brake spring 30. Spring 30, like spring 24, is attached directly to output hub 16 by radially inwardly directed tang 30a which is snugly received into a radially inwardly directed slot in the output hub. The opposite end of the spring 30 is terminated in an outwardly radially directed tang 30b which is engaged within one of a plurality of slots 26b at the opposite edge of stop collar 26 from that in which slots 26a are formed. Helical spring 30 extends the opposite direction from spring 24 and in this embodiment is of the same hand. However, it is normally out of engagement with cylindrical surfaces of the frame hub 12 which it surrounds. Frame hub 12 preferably is immediately axially adjacent to output hub 16 and of the same diameter. In this preferred embodiment the brake spring also surround and engages the output hub 16, as will be explained hereafter. The brake spring 30 is attached to the collar 26 at such a point that stopping the collar in addition to releasing clutch 24 from the input hub will cause the brake spring 30 to wrap down on the frame hub 12, thereby retaining the output hub 16 in a fixed preselected position relative to the frame 10. The hand of the spring selected in a given embodiment is such that, when wrapped down, any tendency for the output hub to continue to rotate in the forward direction of rotation of the input hub will cause brake spring 30 to wrap down more tightly on the hubs.

Figure 1:
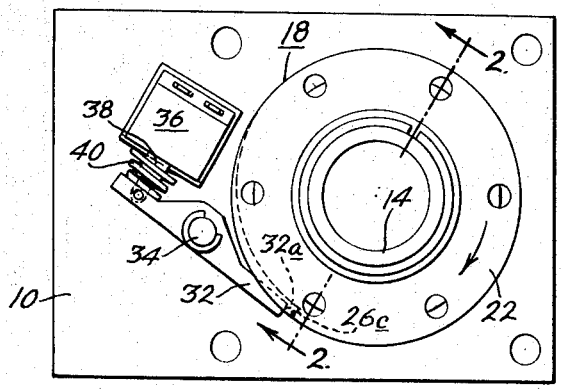
FIG. 1 is an end view of a clutch-brake employing the present invention.

The mechanism stopping rotation of the stop collar in this particular case is a lever 32 pivoted to the frame 10 by a pivot 34. Other simple or more complex structures can obviously be substituted for this stop lever. The lever 32 is actuated by a solenoid generally designated 36, which has its winding support affixed to the frame 10. The solenoid has a movable core 38 which is pivotally attached to the lever 32 at the opposite end from its stop 32a. The core 38 is urged outwardly by spring 40, which urges the lever about pivot 34 to the position shown in FIG. 1 wherein stop 32a will contact shoulder stop 26c. Stop 26c is on an enlarged portion 26d of the stop collar which provides a track against which the end of the lever 32 providing the stop 32a may ride. Thus, normally in its deenergized condition the stop 32a engages the stop shoulder 26c to hold the clutch disengaged and the brake on.

The device, as illustrated, is a single revolution clutch wherein the solenoid 36 may be momentarily energized to pull its core 38 into the winding against the action of the spring and move lever 32 and stop ends 32a away from stop shoulder 26c on collar 26. Release of collar 26 allows the collar to rotate after clutch spring 24 though its natural resilience closes down on the rotating input hub 18 and begins to drive output hub 16 and shaft 14 to which it is pinned. This same rotation of the collar releases the brake and allows the rotation to proceed. One full revolution of the collar, assuming the solenoid has been subsequently deenergized to urge the lever stop 32a against track 26d, will stop the collar 26 at the original position. The drawings show the clutch-brake in a position with the clutch 24 engaged and the brake 30 disengaged just before the stop 32a engages shoulder 26c. When the stop 32a contacts shoulder 26c, the collar 26 will stop and the clutch spring 24 will begin to unwind, releasing the input hub 18 and at the same time allowing the brake spring 30 to close down around the frame hub 12 and hold the output hub 16 in a selected position. At that time antibackup spring 20 acts between the frame hub and the output hub to prevent rotation reverse of the shaft under the force of resilience of the clutch spring 24. Such reverse of rotation would allow the clutch to reengage, and the brake spring 20 to disengage. Any tendency toward backward motion expands the spring to prevent backward motion. However, motion is in such direction as to collapse the spring and therefore the spring 20 has no effect on forward motion.

Figure 4:
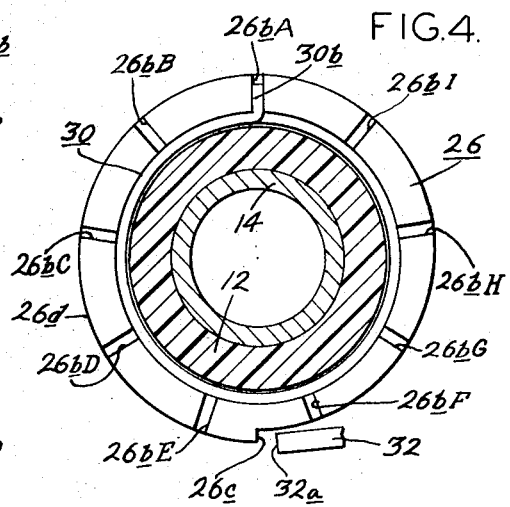
FIG. 4 is a sectional view along line 4–4 of FIG. 2.
Figure 5:
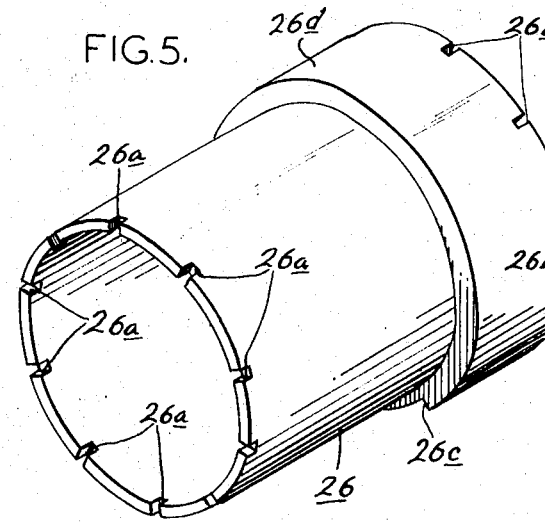
FIG. 5 is a perspective view of the one-piece tubular stop collar in accordance with the present invention.
Figure 6:
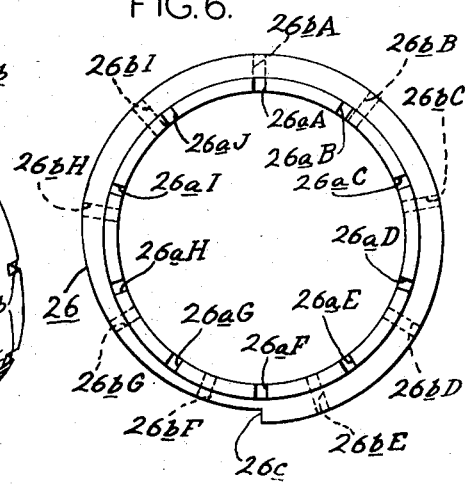
FIG. 6 is a diagrammatic view showing the relative positions of points of spring attachment at the opposite end of the one-piece collar of FIG. 5.

Reference is now made particularly to stop collar 26 shown in FIGS. 3, 4, 5 and 6. It will be observed in FIG. 3 that there are ten slots 26a at one end of the tubular collar structure, each suitable to receive tang 24b of the clutch spring 24. As seen in FIG. 4 at the other end of the stop collar there are nine slots 26b each suitable to receive tang 30b of the brake spring 30. In FIG. 6 slots 26a are designated by suffixes A, B, C, D, E, F, G, H, I, J, and slots 26b are designated by suffixes A, B, C, D, E, F, G, H and I to their respective number designators.

FIG. 6 is a diagram showing the relative locations of these slots superimposed upon one another as though the collar structure were transparent. It will be observed that slots 26a-A and 26b-A are superimposed and progressing clockwise around the diagram there is increasing distance between slots with similar suffixes. Thus there is a small space between slots 26a-B and 26b-B. There is a greater space between slots 26a-C and 26b-C. The angular distance increases between slots with similar suffixes as one progresses clockwise around the collar. The space between 26d-J and slot 26b-A is somewhat larger yet than the space between the slots 26a-I and 26b-I. Continuing to proceed around again the space between slots becomes increasingly greater. It is possible to continue around ten times without repeating combinations until the combination of 26b-A and 26b-H is repeated and each successive round shows successively increased spacings. Upon analysis it appears that there are 90 combinations of slots to accommodate the ends of the springs and they are so distributed that combinations occur every 4° and it is possible to accommodate any spacing between the ends of the clutch and the brake springs to within ±2° of angular tolerances. The following is a table showing angular spacing between each possible combination of slots at opposite ends of the collar.

|  | 26b-A | 26b-B | 26b-C | 26b-D | 26b-E | 26b-F | 26b-G | 26b-H | 26b-I |
|---|---|---|---|---|---|---|---|---|---|
| 26a-A | 0 | 40 | 80 | 120 | 160 | 200 | 240 | 280 | 320 |
| 26a-B | 36 | 76 | 116 | 156 | 196 | 236 | 276 | 316 | 356 |
| 26a-C | 72 | 112 | 152 | 192 | 232 | 272 | 312 | 352 | 32 |
| 26a-D | 108 | 148 | 188 | 228 | 268 | 308 | 348 | 28 | 68 |
| 26a-E | 144 | 184 | 224 | 264 | 304 | 344 | 24 | 64 | 104 |
| 26a-F | 180 | 220 | 260 | 300 | 340 | 20 | 60 | 100 | 140 |
| 26a-G | 216 | 256 | 296 | 336 | 16 | 56 | 96 | 136 | 176 |
| 26a-H | 252 | 292 | 332 | 12 | 52 | 92 | 132 | 172 | 212 |
| 26a-I | 288 | 328 | 8 | 48 | 88 | 128 | 168 | 208 | 248 |
| 26a-J | 324 | 4 | 44 | 84 | 124 | 164 | 204 | 244 | 284 |

While in the present case using nine slots on one end and ten on the other, accommodation is provided every 4° of rotation. In other cases the invention provides the possibilities using differing numbers of slots for the clutch and brake springs (i.e., $x$ and $y$). In each case where the difference in the number of slots employed is one ($x - y = 1$), the possible combinations is the product of the two numbers ($x\ y$) and, where evenly spaced, combinations of slots are repeated every $360°/xy$. Nor is it necessary to employ a difference of only one ($x - y = 1$), although this is preferred as giving a maximum number of possible combinations for a given number of slots.

I claim:

1. In a clutch-brake which comprises:
a frame;
input and output means including, respectively input and output hubs rotatable relative to the frame and to each other;
a brake hub affixed to the frame;
said hubs being coaxial and arranged so that the output hub lies axially intermediate the input and brake hubs;
a helical clutch spring wound about at least the input hub and fixed at one end to the output hub;
a helical brake spring wound about at least the brake hub and fixed at one end to the output hub;
a common stop collar of tubular form engaging the opposite ends of the respective brake and clutch springs, such that relative rotational movement between the stop collar and the output hub in one direction will cause the clutch spring to disengage from the input hub and the brake spring to engage the frame hub and relative motion in the other direction will reverse the action; and
the improvement of providing the stop collar with a predetermined number of prefabricated connecting devices for the clutch spring distributed around a selected circumference of the collar and a different number of prefabricated connecting devices for the brake spring distributed around another circumference of the collar, whereby rotational change of collar position permits selection of the approximate angular spacings between the ends of the spring to be attached to the collar from a discrete number of combinations of connecting devices in order to provide optimum spacing of the spring ends to accomplish alternatively clutch engagement and braking.

2. The clutch-brake of claim 1 in which the prefabricated connecting devices for the respective springs on the collar in each case are slots snugly accommodating the tang.

3. The clutch-brake of claim 2 in which the prefabricated connecting devices are slots extending axially inwardly from the opposite ends of the tubular collar.

4. The clutch-brake of claim 1 in which the prefabricated connecting devices for each of the respective springs on the collar are distributed evenly around their respective circumferences of the collar.

5. The clutch-brake of claim 4 in which the number of prefabricated connecting devices provided respectively for the spring and the clutch differ by only one.

6. The clutch-brake of claim 5 in which there are nine prefabricated connecting devices for one spring tang and 10 prefabricated points of attachment for the other spring tang.